United States Patent
Pangalila

(10) Patent No.: US 10,933,967 B2
(45) Date of Patent: Mar. 2, 2021

(54) PARTITION WALL IN CABIN OF AIRCRAFT SUPPORTING MONUMENTS

(71) Applicant: Airbus Americas, Inc., Herndon, VA (US)

(72) Inventor: Iwan Pangalila, Spanish Fort, AL (US)

(73) Assignee: AIRBUS AMERICAS, INC., Herndon, VA (US)

(*) Notice: Subject to any disclaimer, the term of this patent is extended or adjusted under 35 U.S.C. 154(b) by 377 days.

(21) Appl. No.: 15/843,169

(22) Filed: Dec. 15, 2017

(65) Prior Publication Data
US 2019/0185128 A1    Jun. 20, 2019

(51) Int. Cl.
| | |
|---|---|
| *B64C 1/10* | (2006.01) |
| *B64C 1/06* | (2006.01) |
| *B64D 11/00* | (2006.01) |
| *B64D 11/02* | (2006.01) |
| *B64D 11/04* | (2006.01) |

(52) U.S. Cl.
CPC .............. *B64C 1/10* (2013.01); *B64C 1/061* (2013.01); *B64D 11/02* (2013.01); *B64D 11/04* (2013.01); *B64C 1/068* (2013.01); *B64D 11/0023* (2013.01)

(58) Field of Classification Search
CPC ....... B64C 1/10; B64C 1/061; B64D 11/0023; B64D 2011/0046
See application file for complete search history.

(56) References Cited

U.S. PATENT DOCUMENTS

| | | | |
|---|---|---|---|
| 4,022,404 A * | 5/1977 | Greiss ............... | B64D 11/0007 244/118.5 |
| 4,139,101 A | 2/1979 | Towfigh | |
| 4,728,059 A | 3/1988 | Stephen et al. | |
| 5,314,143 A | 5/1994 | Luria | |
| 6,490,828 B1 * | 12/2002 | Fuller .................... | B32B 3/266 52/36.1 |
| 6,676,079 B2 | 1/2004 | Takeshima | |
| 7,198,228 B2 | 4/2007 | Mills et al. | |
| 7,530,529 B2 | 5/2009 | Bock | |
| 7,954,761 B2 | 6/2011 | Johnson et al. | |
| 8,123,165 B2 | 2/2012 | Breuer et al. | |
| 8,313,058 B2 | 11/2012 | Saint-Jaimes et al. | |
| 8,474,758 B2 | 7/2013 | Koefinger et al. | |
| 8,882,032 B2 | 11/2014 | Pangalila | |

(Continued)

FOREIGN PATENT DOCUMENTS

| | | |
|---|---|---|
| EP | 2727822 | 5/2014 |
| EP | 3075650 | 10/2016 |

(Continued)

OTHER PUBLICATIONS

European Search Report cited in EP 18211524.6 dated Apr. 24, 2019, 8 pages.

(Continued)

*Primary Examiner* — Nicholas McFall
*Assistant Examiner* — Terri L Filosi
(74) *Attorney, Agent, or Firm* — Nixon & Vanderhye, P.C.

(57) ABSTRACT

An aircraft includes a partition wall for supporting monuments such as lavatories and galleys. The partition wall may support a large majority of the weight of the monuments such that the flooring of the aircraft is relieved of the force from various monuments. Additionally, the partition wall may be used to support the fuselage of the aircraft.

18 Claims, 9 Drawing Sheets

(56) References Cited

U.S. PATENT DOCUMENTS

| | | |
|---|---|---|
| 9,010,686 B2 | 4/2015 | Saint-Jaimes et al. |
| 9,199,738 B2 | 12/2015 | Tan et al. |
| 9,452,620 B2 | 10/2016 | Sevtsuk et al. |
| 2001/0050519 A1 | 12/2001 | Kasuya |
| 2003/0066931 A1 | 4/2003 | Ward |
| 2005/0116098 A1 | 6/2005 | Martens et al. |
| 2006/0054741 A1 | 3/2006 | Mills et al. |
| 2008/0217478 A1 | 9/2008 | Keeler et al. |
| 2009/0065641 A1 | 3/2009 | Koehn et al. |
| 2009/0224103 A1 | 9/2009 | Neumann et al. |
| 2009/0242149 A1 | 10/2009 | Breuer et al. |
| 2009/0242150 A1 | 10/2009 | Mosler et al. |
| 2009/0283636 A1* | 11/2009 | Saint-Jalmes ...... B64D 11/0627 244/118.5 |
| 2009/0289146 A1* | 11/2009 | Gauggel ................ B64C 1/40 244/1 N |
| 2009/0308973 A1 | 12/2009 | Guering |
| 2010/0219292 A1 | 9/2010 | Saint-Jaimes et al. |
| 2011/0114788 A1 | 5/2011 | Mosler et al. |
| 2011/0309194 A1 | 12/2011 | Pangalila |
| 2012/0006941 A1 | 1/2012 | Tan et al. |
| 2012/0085862 A1 | 4/2012 | Pangalila |
| 2012/0217342 A1 | 8/2012 | Tan et al. |
| 2013/0206904 A1 | 8/2013 | Gee et al. |
| 2016/0297528 A1* | 10/2016 | Sankrithi ................ B64C 1/00 |

FOREIGN PATENT DOCUMENTS

| | | |
|---|---|---|
| FR | 2953194 | 6/2011 |
| WO | 01/04001 | 1/2001 |
| WO | 2008/006955 | 1/2008 |

OTHER PUBLICATIONS

Vasantha Kumar et al., "Optimization of Aircraft Fuselage Bulkhead Structure Using Msc/Patran and Nastran Software", International Journal of Innovative Research in Science, Engineering and Technology, vol. 4, Issue 6, Jun. 2015, 6 pages.

* cited by examiner

PARTITION WALL IN CABIN OF AIRCRAFT SUPPORTING MONUMENTS

BACKGROUND OF THE INVENTION

Partition walls are used in the cabin of an aircraft fuselage to separate the cockpit from the passenger area, and divide the passenger area into different service classes such as first class and economy class. Partition walls are also used to form areas in the passenger area for galleys and lavatories.

Partition walls are conventionally light weight panels attached to the walls, floor and ceiling of the cabin. Partition walls are conventionally not structural and do not provide structural supports for monuments in the cabin, such as galleys and lavatories. However, partition walls have been used to provide structural support for cockpit doors.

Conventional partition walls are distinct from bulkheads. Bulkheads are structural components attached directly to a fuselage. In commercial aircraft, bulkheads are typically used at the rear of the fuselage to separate the cabin, which is pressurized, from the interior of the empennage portion of the fuselage which is not pressurized.

SUMMARY OF THE INVENTION

A partition wall has been invented for a cabin of an aircraft fuselage. The partition wall provides structural support for monuments. The partition wall may substantially entirely support the monument(s). The partition wall is fixed directly to the fuselage and may form a structural frame of the fuselage. The partition wall transfers the weight of the monument directly to the fuselage.

The weight of the monument is not borne by the floor of the cabin. Because it no longer bears the weight of the monument(s), the floor is better able to support additional passenger seating or may be configured as a lighter weight floor having a lower loadbearing capacity.

Mounts for monuments are integrated into the partition wall, such as being embedded in supporting posts of the wall. The mounts in the partition wall are attached to mating mounts in a wall of a monument. The mounts in the partition wall and their position on the wall may be standardized. The standardization of the mounts on the partition wall allows for standardization of mounts on monuments. This standardization of the mounts on the monuments simplifies the design of monuments and the approval of monument designs for use in an aircraft.

The partition wall may also provide structural support for doors to a cockpit. These doors may be heavy because they are built to withstand intruder attacks. These doors are well supported by the partition wall because the wall is a structural support component attached directly to the fuselage. Moreover, the partition wall may itself be configured to withstand intruders such as being covered by a ballistic panel capable of stopping bullets from a gun.

In an embodiment, the invention is a partition wall for use in an aircraft comprising: a partition frame configured to attach directly to a frame a fuselage; a lattice having a periphery attached to the partition frame; and mounts supported by the lattice, wherein the mounts are each configured to be fastened to a respective mating mount on a wall of a monument, wherein the partition wall is configured to support at least half of the weight of the monument.

The partition frame may extend substantially entirely around an inside surface of the fuselage. The partition frame may be integral and a single piece component with the fame of the fuselage. The lattice may be a lattice of posts and the posts are interconnected to each other and directly connected to the frame of the partition wall.

The mounts may be housed within cavities of the posts. The mounts may each include a stem configured to receive a bolt or pin of the respective mating mount in the wall of the monument.

The lattice may be oriented vertically and has an outer surface aligned with a vertical plane, wherein the outer surface is configured to abut the wall of the monument. The lattice may include a support bracket attached to the lattice, wherein the support bracket extends perpendicular to the vertical plane of the outer surface of the lattice.

In another embodiment, the invention is an aircraft comprising: a fuselage having a frame oriented in a plane perpendicular to an axis of the fuselage and extending substantially entirely around the fuselage, wherein the frame supports an outer skin of the fuselage; a cabin within the fuselage; a partition wall within the cabin and parallel to the plane, the partition wall having a partition wall frame attached directly to the frame of the fuselage and a lattice attached to the frame of the partition wall, wherein the lattice forms a wall within the cabin; and a monument in the cabin, wherein the monument has a wall attached to the partition wall such that at least half of the weight of the monument is supported by the partition wall. The monument may be a lavatory or a galley for food service.

The lattice may include posts which are interconnected with each other and with the frame of the partition wall, and the posts include mounts which directly attach to mounts in the wall of the monument. There may be mounts housed within cavities of the posts and the mounts are configured to receive a bolt or pin of a respective mating mount in the wall of the monument. The frame of the partition wall may be integral with the frame or former of the fuselage. A floor of the cabin may extend through the partition wall and the partition wall extends around the floor.

The lattice may be oriented vertically and has an outer surface aligned with a vertical plane, wherein the outer surface is configured to abut the wall of the monument.

There may be a first partition wall and a second partition wall within the cabin and parallel to the plane, the second partition wall having a partition wall frame attached directly to the frame of the fuselage and a lattice attached to the frame of the partition wall, wherein the lattice forms a wall within the cabin; wherein the first partition wall include mounts configured to attach to the monument and the second partition wall includes mounts configured to attach to a second monument, and wherein the mounts in the first partition wall are uniform in shape and size with the mounts in the second partition wall and that the mounts on the first and second partition walls are at uniform locations on their respective first or second partition wall.

The invention may be embodied as a method to mount and support a monument a cabin of an aircraft fuselage, the method comprising: positioning a monument in the cabin such that a wall of the monument is against a partition wall in the cabin, wherein the partition wall is directly affixed to a frame in the aircraft fuselage; aligning mounts in the wall of the monument with mounts in the partition wall; attaching each of the aligned mounts in the wall of the monument to a corresponding one of the mounts in the partition wall, and supporting at least half of the weight of the monument by attached mounts in the wall of the monument and the partition wall, such that the at least half of the weight of the monument is transferred through the partition wall and directly to the aircraft fuselage.

The method may include positioning pads between a bottom surface of the monument and a floor of the cabin, wherein the pads are positioned on the floor to vertically align with a floor joist of the floor. The monument may be a lavatory.

The step of attaching of each of the aligned mounts may include inserting a pin or bolt through each of the mounts in the wall of the monument and into respective ones of the mounts in the partition wall.

DESCRIPTION OF THE INVENTION

Figure 1:
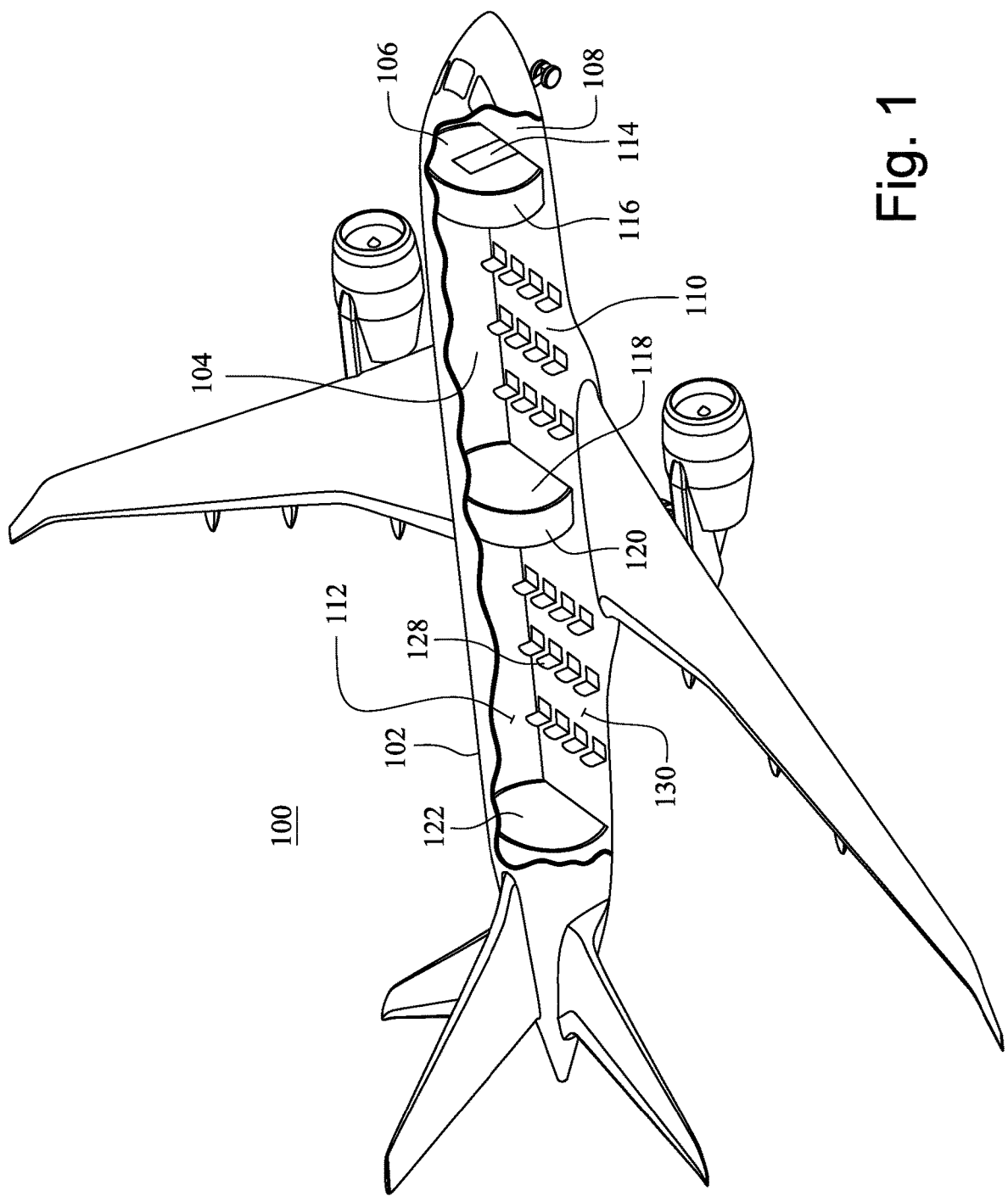
FIG. 1 depicts an aircraft with a portion of the cabin exposed for viewing.

FIG. 1 shows an aircraft 100 having a fuselage 102 with an interior cabin 104 divided by a first partition wall 106 into a cockpit 108 and passenger regions 110, 112 of the cabin. A door 114 in the first partition wall 106 allows access to the cockpit 108 from the passenger region 110. A galley 116 is mounted to and supported by the first partition wall 106. A second partition wall 118 separates the passenger regions 110, 112. A lavatory 120 is mounted to and supported by the second partition wall 118. A third partition wall 122 is at the rear of the passenger region 112 and may also be configured to support one or more lavatories.

The galley 116 and lavatory 120 are examples of interior cabin monuments. These monuments are relatively large and heavy components of the interior of the cabin 104. Monuments are often specially selected, designed or modified by the airline or other customer purchasing the aircraft from an aircraft manufacturer. The monuments may be installed in the passenger regions 110, 112 after the manufacture of the aircraft is substantially complete. Monuments are typically heavy, such as weighing more than 500 pounds (225 Kilos).

The partition walls 106, 118, 122 are provided with mounts 124 (see FIGS. 6 to 9) that are configured to connected with corresponding mounts 126 (FIG. 9) embedded in a wall of a monument. By connecting the mounts 126 in the monument to the mounts 124 in the partition wall the monument is substantially supported by the partition wall. Examples of substantial support are that at least fifty percent (50%) or at least seventy five percent (75%) of the weight of the monument is carried by the partition wall. The monument may be partially supported by the floor 130 such as by pads 144 (FIG. 3) between the bottom surface of the monument and the floor 130 of the cabin 104. However, the monument need not be fixed to the floor by brackets or other attachments that directly fix the monument to the floor. This zero bracket approach further minimizes the load applied to the floor.

The load on the floor 130 from the monuments is reduced by substantially supporting the monuments with the partition walls 106, 118 and 122. The partition walls 106, 118, 122 are not supported by the floor 130. The load carried by the partition walls 106, 118, 122, such as due to the monuments, is not applied to the floor 130. By supporting the monuments on the partition wall, the floor 130 may be designed to support primarily just the seating and passengers. Relieving the floor 130 from having to support the monuments allows the floor to support more seating and passengers or for the floor 130 to be designed with lighter-weight components.

The passenger regions 110, 112 may include rows of seating 128. The seating 128 and the passengers who occupy the seats apply a load (weight) to the floor 130. The floor 130 may be designed to support the expected load of the seating, passengers and their canyon luggage, as well as the load of the monuments.

FIGS. 2 to 5 show an exemplary partition wall, partition wall 132, that may be used as any of the first, second and third partition walls 106, 118 and 122 shown in FIG. 1. The partition wall 132 is depicted without a covering so that the components of partition wall are visible. A covering, such as a fabric panel, may cover one or both sides of the partition wall. The portion of the partition wall 132 facing a wall of a monument may not be covered to leave exposed the mounts 124 in the wall that fasten to the mounts 126 in the wall of the monument. The covering may include ballistic panel, especially if the partition wall is between the cabin and the cockpit.

The partition wall 132 includes a partition frame 134 and a lattice 136 of posts 138. The partition frame 134 extends to the fuselage 102. The lattice 136 is, at its perimeter, attached to and supported by the partition frame 134. The lattice 136 transfers the loads applied to the partition wall 132 to the partition frame 134. The partition frame 134 is attached to or integrated with a frame of the fuselage 102. The partition frame 134 transfers the load applied to the partition wall 132 to the fuselage 102.

The partition wall 132 may have an opening 133, such as a rectangular or square shaped opening, in a lower region of the partition wall 132. The opening 133 may be aligned with a landing gear region of the fuselage 102 which is below the floor 130 of the cabin 104. The opening 133 may allow a landing gear to pass through the partition wall 132. Similarly, the partition wall 132 may include a door frame 135 to support a cockpit door or a wider passage between classes of service in the cabin 104.

The partition frame 134 may form or attach to a former 140, frame or bulkhead (collectively referred to as a "former") of the fuselage 102. A portion of the former is shown as 140 in FIG. 2. The attachment between the partition frame 134 and the former 140 may be by welding, glues, bolts and other fasteners. If a partition frame is integral with a former, they may be formed by composite materials shaped into a single component that functions as the partition frame and the former. A former will typically be oriented perpendicular to the axis of the fuselage 102, extend substantially entirely around the fuselage, and support, at its perimeter, the outer skin of the fuselage. The partition frame 134 may also be attached stringers on the fuselage 102. Stringers typically extend axially along the fuselage 102 between formers. The formers and stringers are elements of the structural support for the fuselage.

Figure 10:
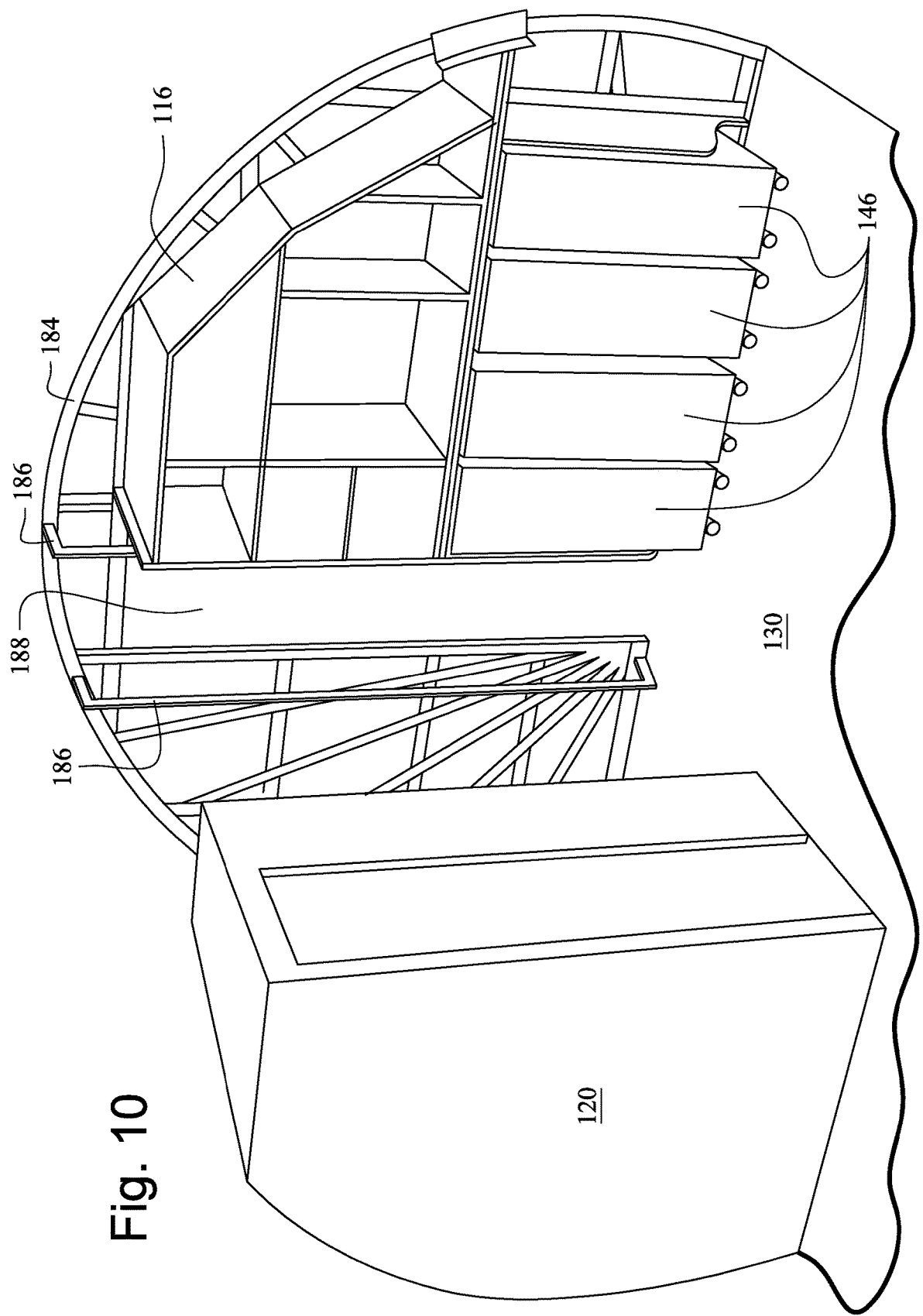
FIG. 10 depicts an alternate partition wall configured to support monuments.

The partition frame 134 may extend substantially entirely around the fuselage 102 (see FIGS. 2 and 3) or only extend partially around the fuselage, such as only above the floor 130 (See. FIG. 10). If the partition wall 132 is to be itself a former, it is preferable that the partition wall 132 extend substantially around the fuselage 102.

Figure 3:
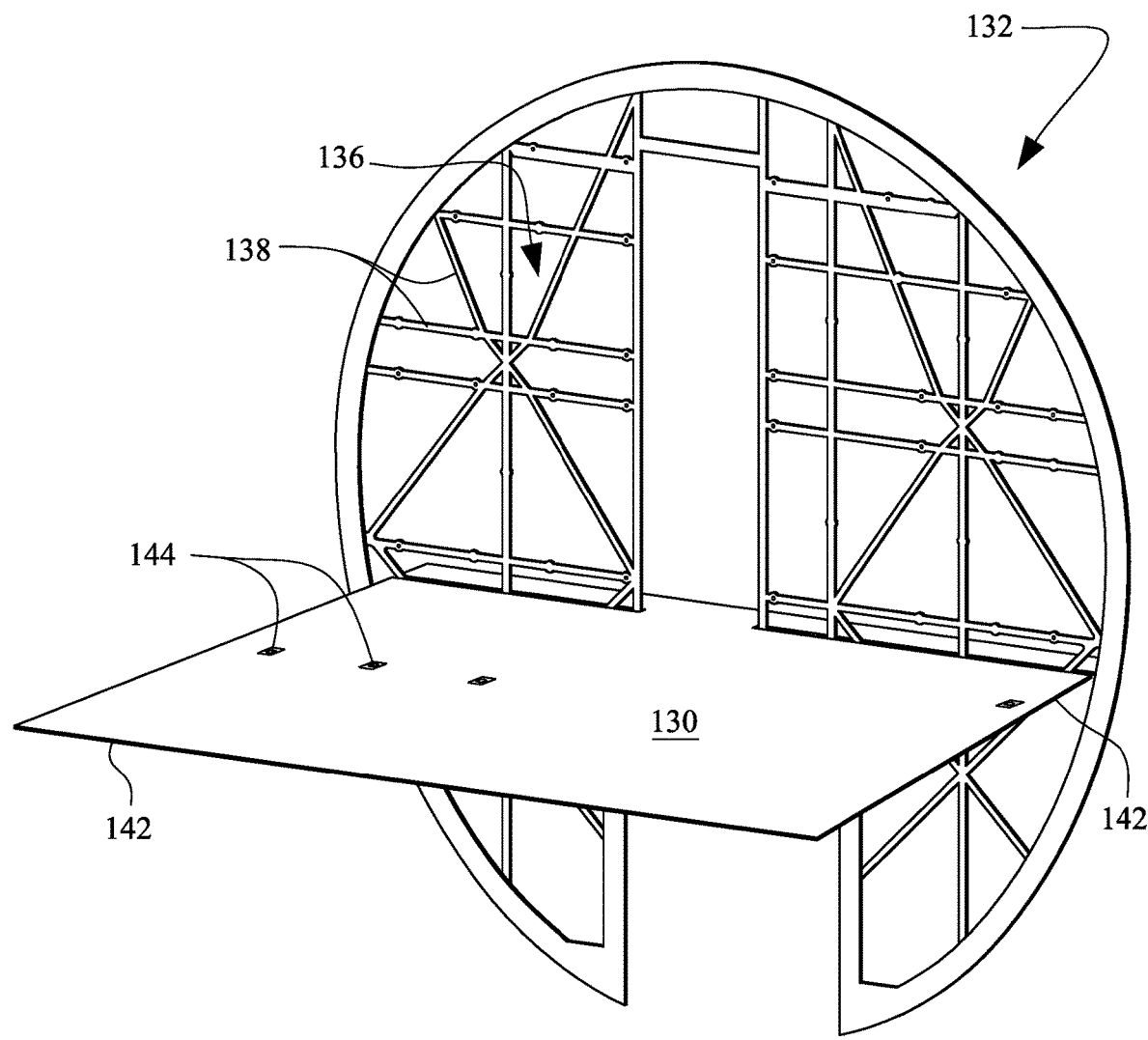
FIG. 3 depicts the partition wall with a floor of the cabin.
Figure 5:
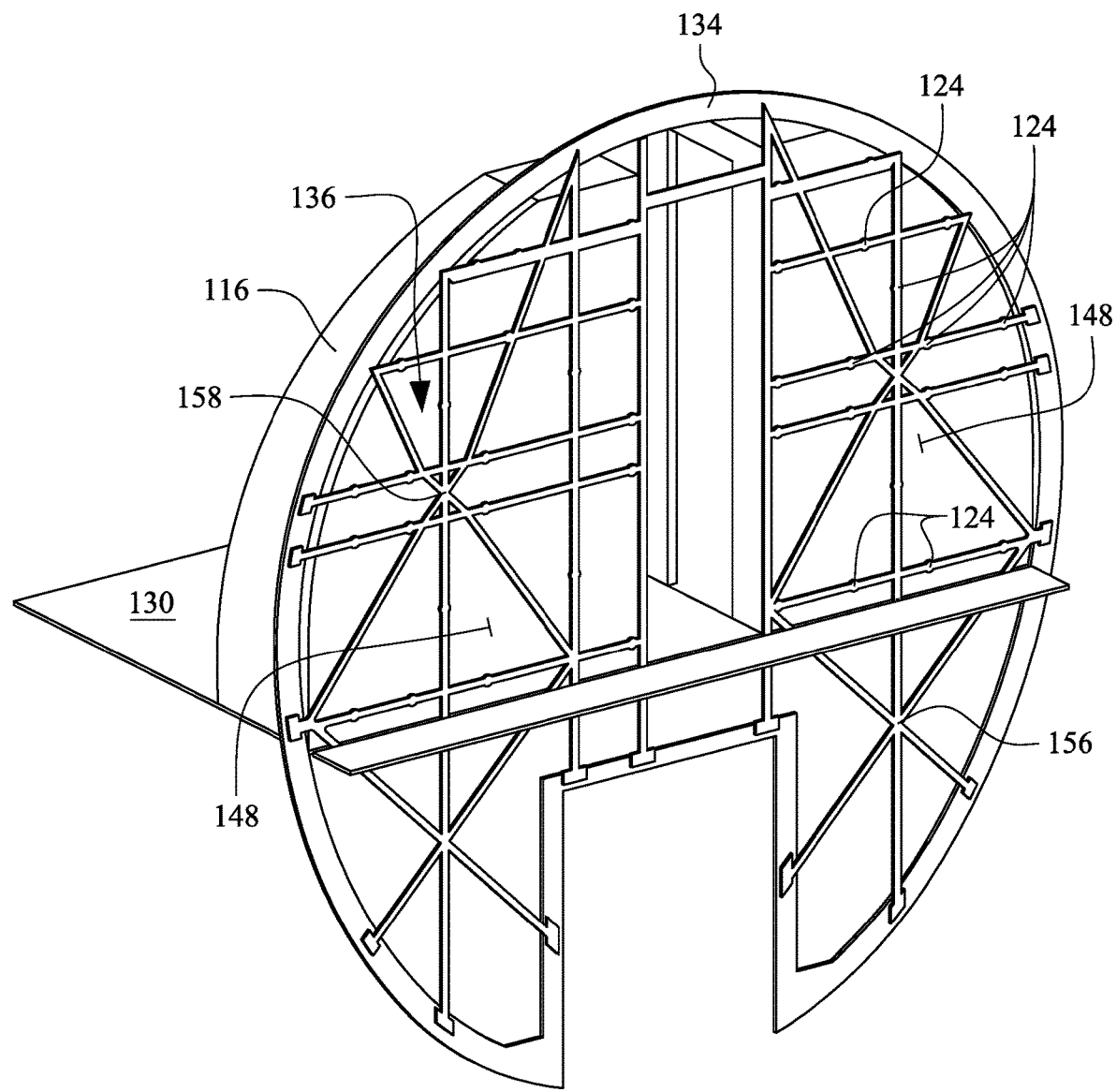
FIG. 5 depicts a side of the partition wall opposite to the side bearing the monuments.

The floor 130 of the cabin 104 may extend through the partition wall 132, such as shown in FIGS. 3 and 5. The floor 130 need not be attached to the partition wall 132. However, there may be fasteners or attachment devices between the floor 130 and the partition wall 132 to assist with the alignment of the floor 130 with respect to the partition wall 132. The floor 130 has edges 142 that attach to the fuselage, such as to stringers which extend axially along an outer region of the fuselage and support the skin of the fuselage. The panel of the floor 130 may be supported by floor joists which are part of the floor and span opposite sides of the fuselage. The floor joists may attach to stringers, frames, formers or bulkheads of the fuselage.

As shown in FIG. 3, the panel of the floor 130 may have support pads 144 aligned with the floor joists. The pads 144 may support large monuments, such as lavatories. The support provided by the pads 144 collectively may be less than half the weight of the monument. More than half of the weight of the monument is supported by the partition wall 132 to which the monument is connected. Lavatory monuments are typically heavier and have a larger cross sectional area than do galley monuments. When occupied by a passenger, a lavatory monument can weight in excess of 700 lbs (320 kilos). The floor pads 144 supporting a lavatory monument assist in supporting these heavier monuments.

Figure 4:
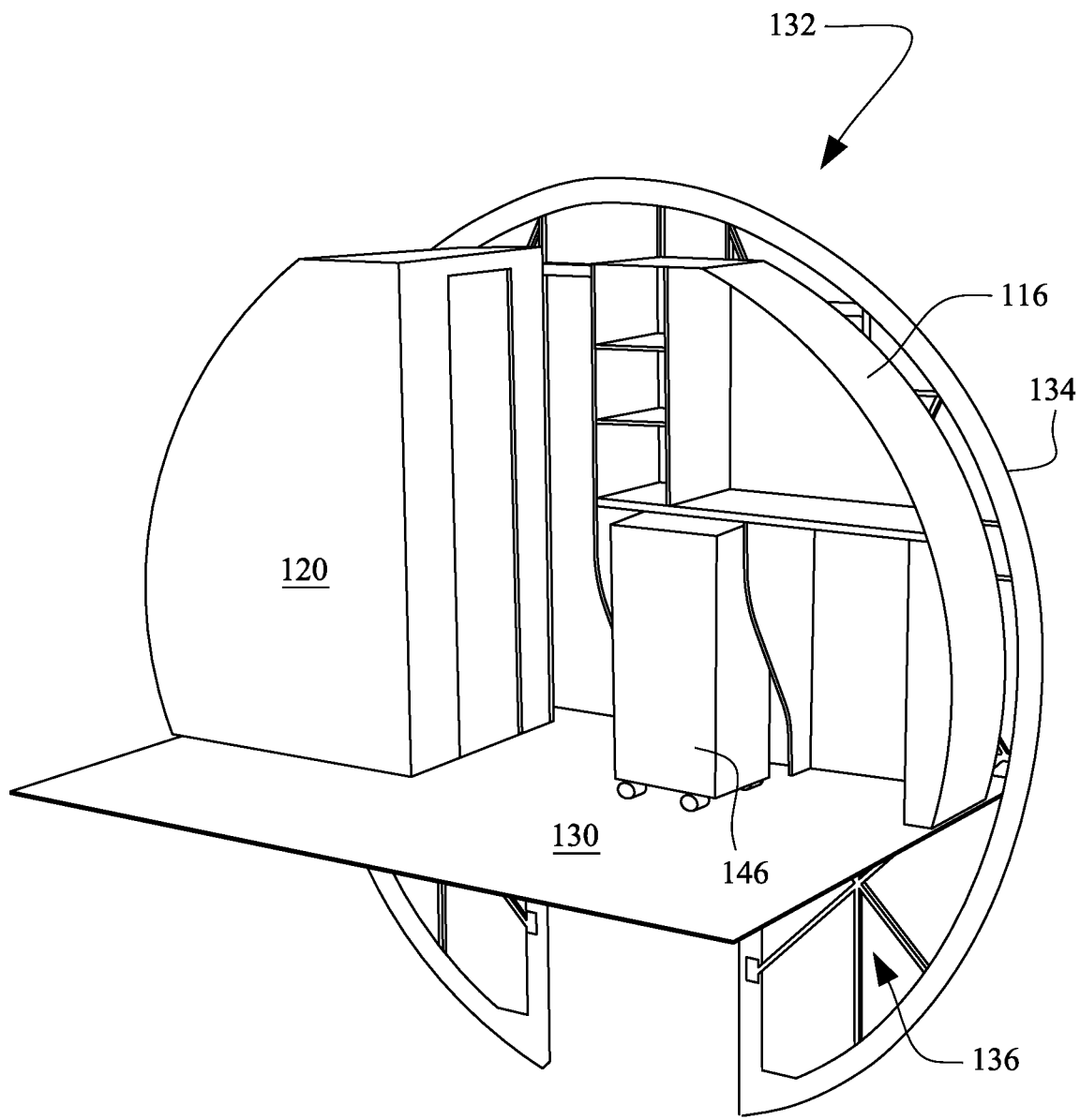
FIG. 4 depicts the partition wall with monuments.

FIG. 4 shows a lavatory monument 120 which is connected to and supported by the partition wall 132. The bottom of the lavatory monument 120 may rest on pads 144 (FIG. 3) on the floor 130. Thus, the lavatory monument 120 may be supported by both the partition wall 132 and the floor 130.

The partition wall 132 shown in FIG. 4 also supports a galley monument 116. The wall 148 (FIG. 5) of the galley monument 116 is connected to the partition wall 132. The bottom of the galley monument 116 may be substantially open to allow for food carts 146 to be docked in the galley monument 116. The back wall 148 of the galley monument 116 is connected to and supported by the partition wall 132. The wall of the monument against the partition wall 132 is typically unseen by passengers and aircraft crew and thus provides a hidden side of the monument on which to arrange connections to mount the monument in the aircraft. The location of the connections additionally does not interfere with the operation of the monument. The connections on the hidden wall of the monument can be arranged to be aligned with connections on the partition wall.

In the partition wall 132, the lattice 136 of posts 138 is attached to the frame 134. The attachment may be by fasteners, such as bolts, screws or clips, welding of the posts to the frame or by forming the lattice 136 and frame 134 as an integral, single piece component forming the partition wall 132. The lattice 136 may be oriented vertically. The outer surfaces of the lattice 136 may be substantially planar.

The lattice 136 is formed by a network of interconnected posts 138. The posts may be substantially straight beams. The posts 138 may be formed by additive layer manufacturing techniques. Moreover, these techniques may be used to form the partition wall 132, including the lattice 136 and frame 134, as a single piece component. Alternatively, the frame 134 may be formed as a component separate from the lattice 136. The lattice 136 may be formed by an assembly of interconnected posts 138. The frame 134 and lattice 138 may be formed of metallic materials, such as lightweight aluminum alloys, of composite materials or of other materials suited for providing structural support for monuments.

To form the lattice 136, the posts 138 may be arranged and interconnected to provide structural support for the monuments and to transfer the load (weight) to the frame 134. The arrangement of the posts 138 may be determined by a finite element analysis that considers the loads to be applied by the monuments and possibly a door to the partition wall 132, a need to transfer these loads through the partition wall 132 to the fuselage 102 and a need to minimize the weight of the partition wall 132. Further, the shape and size of posts 138 may be designed to accommodate the load of the monuments and to position the mounts 124 at locations on the partition wall suited for attaching to the mounts 126 of the monument.

The partition walls 106, 118, 122, 132 enable the cabin to have more seating or have more lightweight components. The partition walls enables the cabin by providing structural support to the monuments and relieving the cabin 104, and particularly the floor 130, from having to support the monuments.

The partition walls 106, 118, 122, 132 also may be used to provide standardization to the support connections between the cabin and the monuments. Standardization may be provided by using uniform mounts 124 in the partition all 132 and positioning those mounts 124 at predetermined locations on the wall. The mounts 124 and their location the partition wall may be uniform. Standardization is provided by using uniform mounts 132 and positioning the mounts at uniform locations on the wall for all of the partition walls 106, 118, 122, 132 in the aircraft.

The standardized mounts 124 in the partition walls 132 provide a means to simplify and expedite the design of the monuments 116, 120. These advantages are gained because the supporting mounts 126 for the monuments need only to be attached to the standardized mounts 124 in the partition wall 132. The person designing the monument knows the location and configuration of the mounts 124 in each of the partition walls because the location and configuration is standardized.

Connecting the monument to standardized mounts 124 in a partition wall can simplify the process of approving the monument for use in the aircraft 100. Most changes in the design or configuration of a monument requires approval that the new design or configuration is suitable for the aircraft 100. The process of approval typically involves a consideration of whether the attachments between the monument and the fuselage 102, floor 130 or other component of the aircraft 100 are proper and do not adversely affect the aircraft 100. This process is simplified if the attachments between the monument are to the standardized mounts 124 on one of the partition walls 106, 118, 122, 132 in the aircraft 100. Because the process of approval is simplified, monuments can be designed and approved for installation in an aircraft more quickly and less expensively than before.

Figure 6:
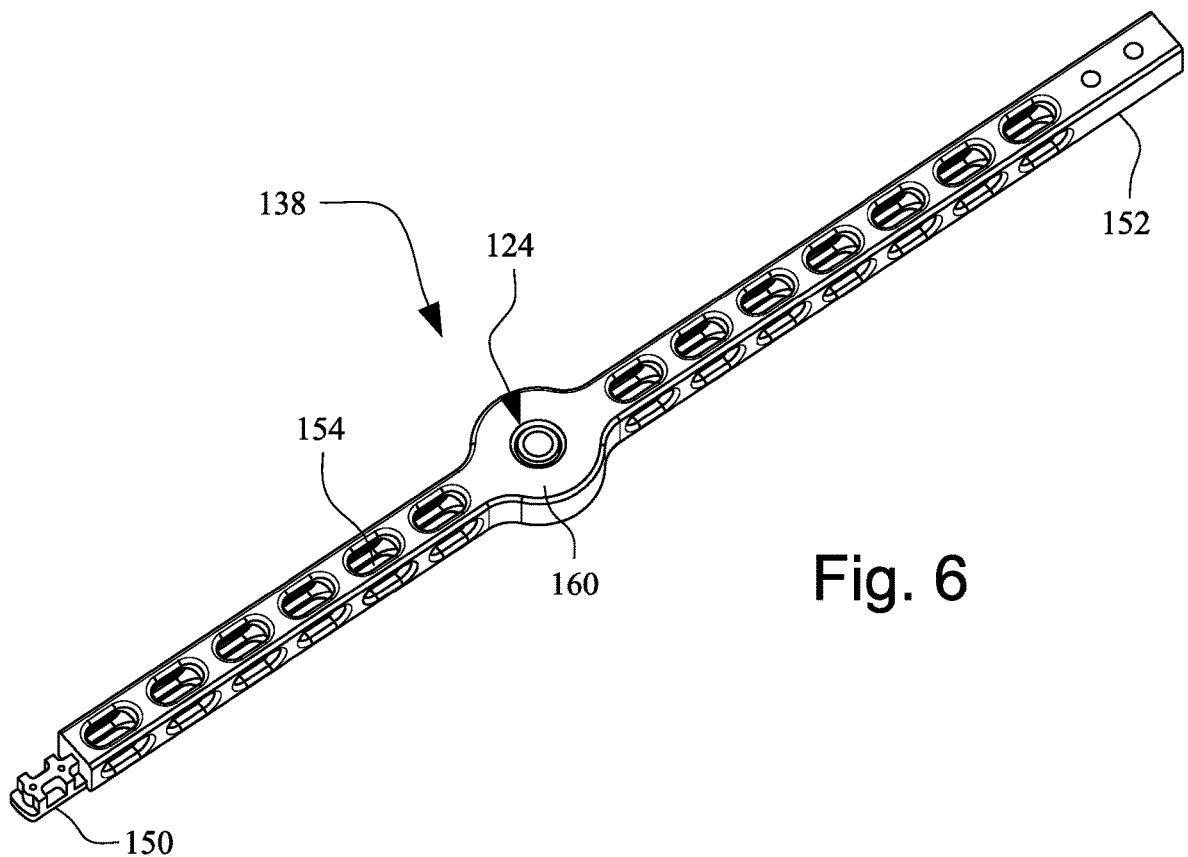
FIG. 6 is a view of a post used in the lattice of the partition wall.

FIG. 6 shows an exemplary post 138 with a center mount 124. The post 138 may be a beam having a straight axis and connectors 150, 152 at opposite ends of the post. The connectors 150, 152 may be, respectively, male and female, connectors which are configured to attach to connectors at ends of other posts. The post may be a beam formed of a light weight metal alloy, such as an aluminum alloy. The posts 138 may have cutouts 154, be hollow and have other weight reducing features. The posts 138 may be connected end to end to form straight posts 138 or beams of the lattice 136. The posts 138 may also be configured to have connections 156 (FIG. 5) extending to the side of a posts 138. Also, the posts 138 may configured to have cross connections 158 (FIG. 5) as needed to form the lattice 136.

Figure 7:
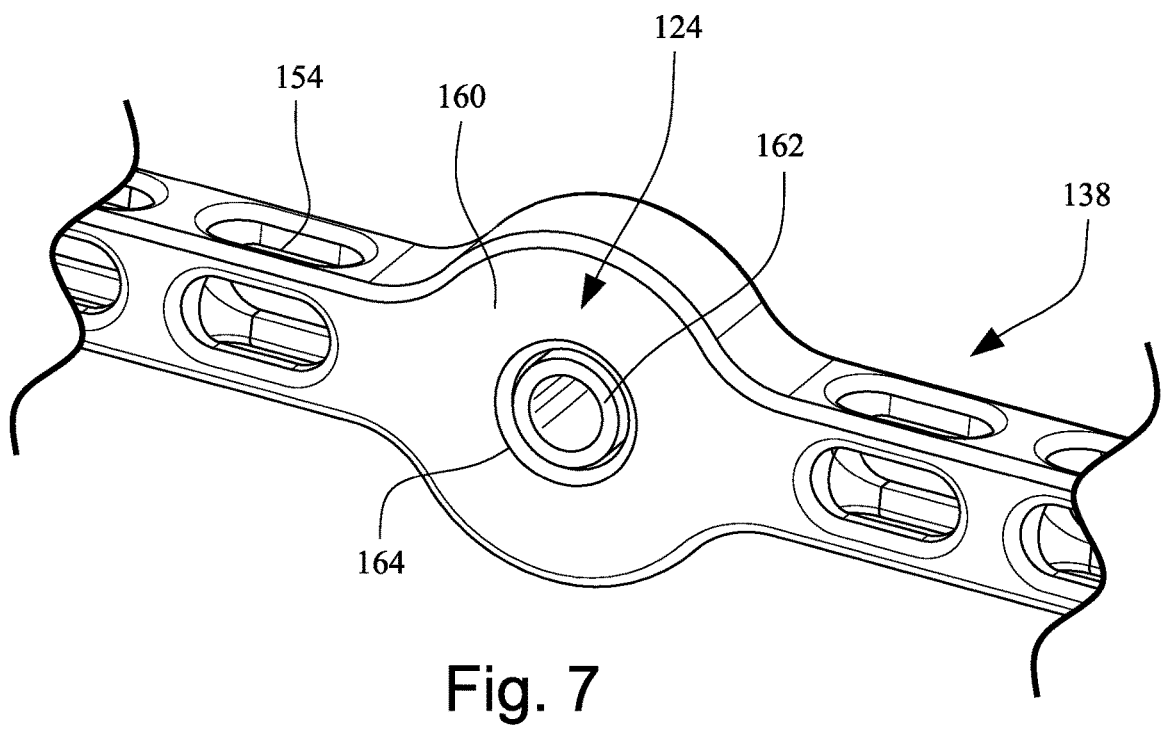
FIG. 7 is an enlarged view of post to show an attachment mount embedded in the post.
Figure 8:
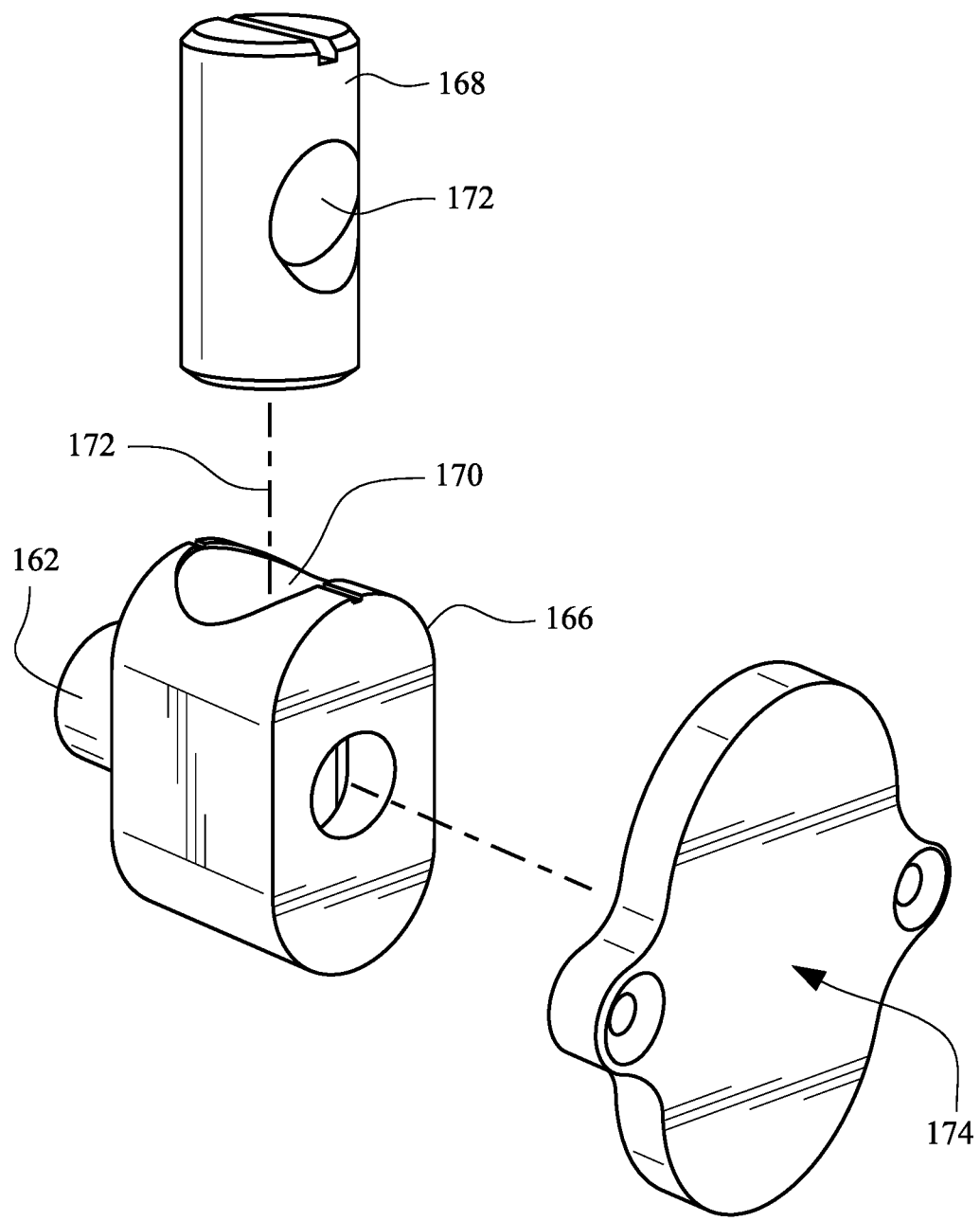
FIG. 8 is an exploded view of the components of an attachment mount.

FIGS. 7 and 8 show an exemplary mount 124. The mounts 124 may be integral with the posts 138. The mounts 124 may be in a wide region 160 of the post 138. The wide region 160 may also be a hollow region that houses the mount 124. The mount may include a hollow stem 162 is configured to receive a male bolt or pin from a mount 126 fixed to a monument. The hollow stem 162 is constrained by an opening 164 in the hollow region 160 of the post. The opening 164 has a substantially larger diameter, such as by 20 percent, than the outer diameter of the stem 162. The larger diameter of the opening 164 allows the stem 162 to move, e.g., float, with respect to the post 138. This movement may assist in aligning the stem 162 with a bolt or pin of a mount 126 in a monument.

The stem 162 of the mount 124 may be integral with a hollow housing 166. The housing 166 has an outer shape to be seated within an interior cavity of the hollow region 160 of the post 138. The interior cavity may be substantially larger in cross sectional area, such as by 20 percent, than the cross sectional area of the housing 166. The large cross sectional area of the interior cavity allows the housing 166 and its stem to move within the cavity to allow the stem to be aligned with a bolt or pin of a mating mount 126. A cylindrical pin 168 seats in a cylindrical cavity 170 in the housing 166. The pin has an opening 172 that may have a threaded interior surface configured to receive a bolt or pin of the mating mount 126. The pin 168 may be slidably mounted in the housing 166 such that the pin can turn or move along an axis 172 to limited extents. The movement is to assist in aligning the bolt or pin from the mount 126 of the monument. A back plate 174 of the mount 124 is attached to the wide region 160 of the post 138. The back plate secures the housing 166 and pin 168 within the cavity of the post 138.

Figure 9:
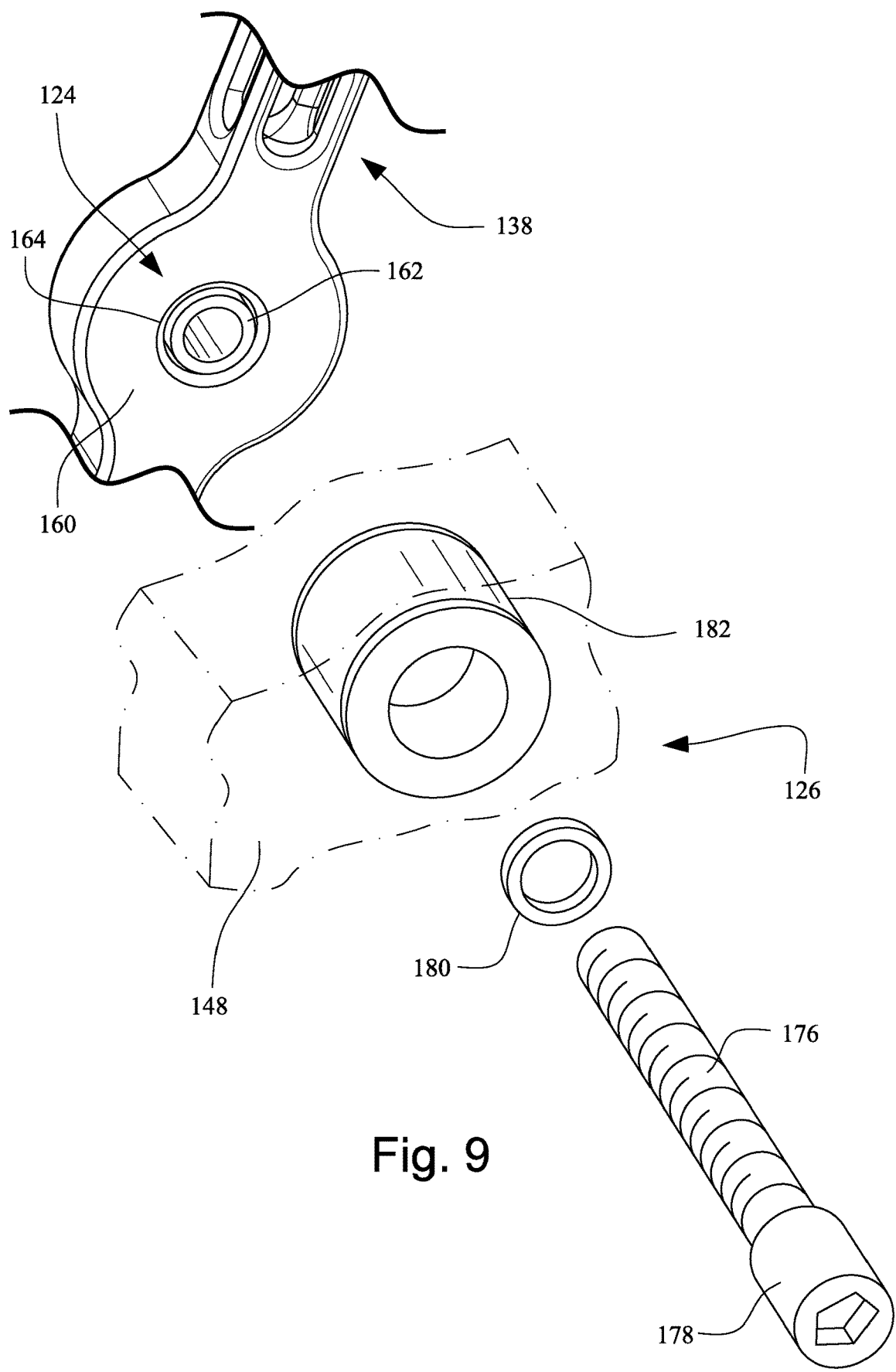
FIG. 9 is an exploded view of a mount to be embedded in a wall of a monument and aligned with the attachment mount in the post.

FIG. 9 shows a mount 126 that is embedded or otherwise fixed to the wall 148 of a monument as it is being aligned with a mount 124 of a partition wall 132. The mount 126 includes a bolt or pin 176 that extends from the mount 126 and engages the stem 162 of the mount 124 in the partition wall 132. The bolt or pin 176 may be cylindrical and have a threaded outer surface that engages a threaded inner surface of the cylindrical opening of the stem 162. The bolt or pin 176 has a head 178 that can engage a wrench or other tool to turn the bolt or pin 176 to engage the stem 162. The head 178 may also seat against a washer 180 that seats on an annular ridge or other surface on a collar 182 that is fixed to the wall 148 of the monument.

The collar 182 is seated in the wall of the monument such that one end of the collar is aligned with an outer surface of the wall and an opposite end of the collar is aligned with an inner surface of the wall. The collars are arranged on the wall 148 of the monument so as to align with corresponding mounts 124 in the partition wall 132. The number of collars and their positions on the wall 148 are determined based on the design and load (weight) of the monument and the locations of the mounts 124 on the partition wall 132.

To attach the monument to the partition wall 132, the wall 148 of the monument is positioned next to the partition wall 132. A technician inside the monument inserts a bolt or pin 176 in each collar 182. It may be necessary to wiggle the bolt or pin 176 to cause the stem 162 in the partition wall 132 to move into alignment with the bolt or pin 176. The bolt or pin 176 is then turned with a wrench to cause the bolt or pin 176 to engage the stem 162 and apply a tension force that secures the wall 148 of the monument to the partition wall 132. This process of inserting pins or bolts in collars and then into the stems is repeated for all of the collars in the wall 148 of the monument. Once all of the pins or bolts are secured to their respect stems, they firmly hold the monument against the partition wall 132. In this manner the partition wall 132 supports the weight of the monument. In addition, the partition wall 132 supports the monument with respect to loads due to the acceleration of the aircraft 100.

Figure 2:
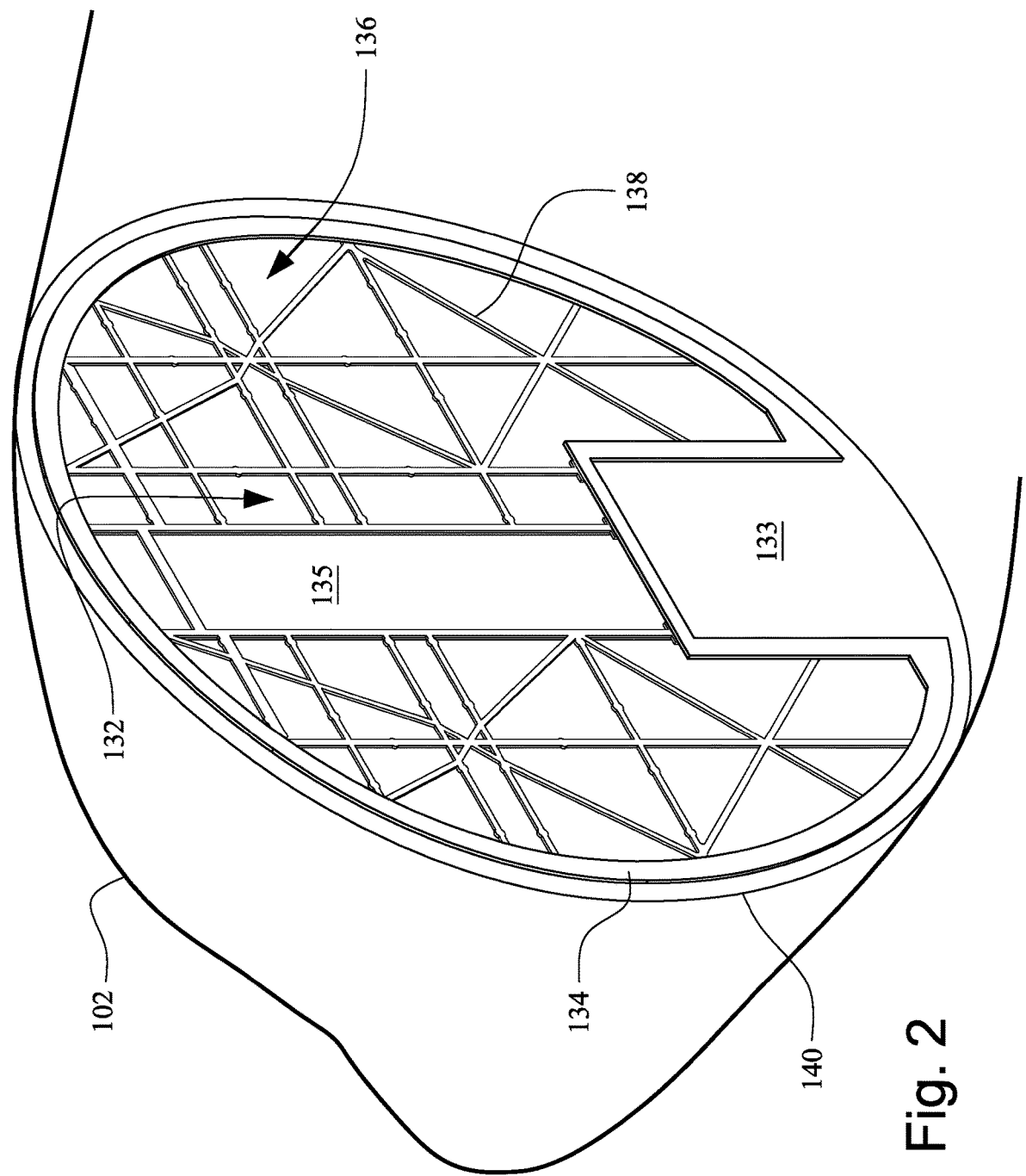
FIG. 2 depicts a partition wall in the cabin.

FIG. 10 shows an alternative partition wall 184 that is similar to the partition wall 132 shown in FIG. 2 except that the wall 184 has a lower edge aligned with the floor 130 of the cabin. The floor need not be interrupted by the partition wall 184 and may be a continuous panel extending the length of the pressurized portion of the cabin.

The partition wall 184 also differs from the wall 132 in that it includes structural brackets 186 extending out of the plane of the main portion of the partition wall 184. The brackets 186 may form a frame of a panel extending perpendicular to the main portion of the partition wall 184. The brackets 186 may assist in forming a secure passage way 188 for a door to the cockpit. The brackets 186 may also assist in providing structural support for the monuments 120, 116, especially with respects to forces due to acceleration that act perpendicular to the axis of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A cabin of a fuselage of an aircraft, the cabin comprising:
 a partition wall in the cabin, wherein the partition wall includes:
  a partition frame attached directly to a frame of the fuselage;
  a lattice having a periphery attached to the partition frame, wherein the lattice is oriented vertically and has an outer surface aligned with a vertical plane, and the outer surface is configured to abut a wall of a monument; and
  mounts supported by the lattice, wherein the mounts are each configured to be fastened to a respective mating mount on the wall of the monument,
 wherein the partition wall is configured to support at least half of the weight of the monument, and
 the partition wall divides the cabin into regions.

2. The partition wall according to claim 1, wherein the partition frame extends entirely around an inside surface of the fuselage.

3. The partition wall according to claim 1, wherein the partition frame is integral and a single piece component with the frame of the fuselage.

4. The partition wall according to claim 1, wherein the lattice is a lattice of posts and the posts are interconnected to each other and directly connected to the frame of the partition wall.

5. The partition wall according to claim 4, wherein the mounts are housed within cavities of the posts.

6. The partition wall according to claim 1, wherein the mounts each include a stem configured to receive a bolt or pin of the respective mating mount in the wall of the monument.

7. The partition wall according to claim 1, wherein the partition wall includes a support bracket attached to the lattice, wherein the support bracket extends perpendicular to the vertical plane of the outer surface of the lattice.

8. An aircraft comprising:
a fuselage having a frame oriented in a plane perpendicular to an axis of the fuselage and extending entirely around the fuselage, wherein the frame supports an outer skin of the fuselage;
a cabin within the fuselage;
a partition wall within the cabin, dividing the cabin into regions and parallel to the plane, the partition wall having a partition wall frame attached directly to the frame of the fuselage and a lattice attached to the frame of the partition wall, wherein the lattice forms a wall within the cabin and the lattice is oriented vertically and has an outer surface aligned with a vertical plane, and
a monument in the cabin, wherein the monument has a wall attached to the partition wall such that at least half of the weight of the monument is supported by the partition wall, wherein the outer surface of the lattice is configured to abut the wall of the monument.

9. The aircraft of claim 8 wherein the monument is a lavatory or a galley for food service.

10. The aircraft of claim 8 wherein the lattice includes posts which are interconnected with each other and with the frame of the partition wall, and the posts include mounts which directly attach to mounts in the wall of the monument.

11. The aircraft of claim 10 further comprising mounts housed within cavities of the posts and the mounts are configured to receive a bolt or pin of a respective mating mount in the wall of the monument.

12. The aircraft of claim 8 wherein the frame of the partition wall is integral with the frame or former of the fuselage.

13. The aircraft of claim 8 further comprising a floor of the cabin, wherein the floor extends through the partition wall and the partition wall extends around the floor.

14. The aircraft of claim 8 wherein the partition wall is a first partition wall and the aircraft further comprises a second partition wall within the cabin and parallel to the plane, the second partition wall having a partition wall frame attached directly to the frame of the fuselage and a lattice attached to the frame of the partition wall, wherein the lattice forms a wall within the cabin;
wherein the first partition wall include mounts configured to attach to the monument and the second partition wall includes mounts configured to attach to a second monument, and
wherein the mounts in the first partition wall are uniform in shape and size with the mounts in the second partition wall and that the mounts on the first and second partition walls are at uniform locations on their respective first or second partition wall.

15. A method to mount and support a monument in a cabin of an aircraft fuselage, the method comprising:
positioning a monument in the cabin such that a wall of the monument is against a partition wall in the cabin, wherein the partition wall is directly affixed to a frame in the aircraft fuselage and the partition wall divides regions of the cabin;
aligning mounts in the wall of the monument with mounts in the partition wall;
attaching each of the aligned mounts in the wall of the monument to a corresponding one of the mounts in the partition wall, and
supporting at least half of the weight of the monument by the attached mounts in the wall of the monument and the partition wall, such that the at least half of the weight of the monument is transferred through the partition wall and directly to the aircraft fuselage.

16. The method of claim 15 further comprising positioning pads between a bottom surface of the monument and a floor of the cabin, wherein the pads are positioned on the floor to vertically align with a floor joist of the floor.

17. The method of claim 16 wherein the monument is a lavatory.

18. The method of claim 15 wherein the attaching of each of the aligned mounts includes inserting a pin or bolt through each of the mounts in the wall of the monument and into respective ones of the mounts in the partition wall.

* * * * *